J. P. WILSON.
CHAIN LUG.
APPLICATION FILED MAY 13, 1915.
1,226,156.
Patented May 15, 1917.
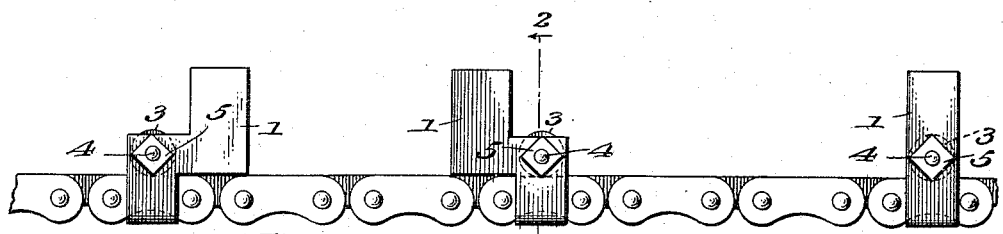
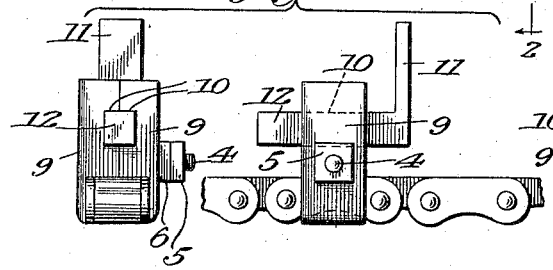  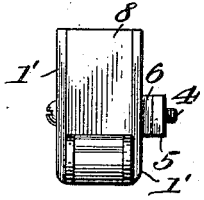
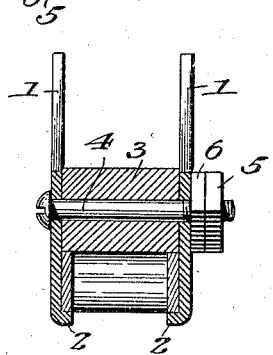 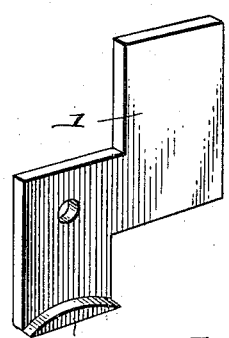
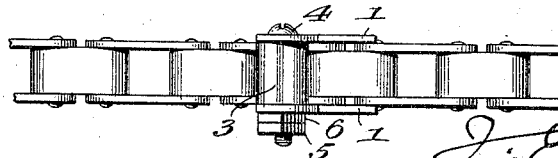
Inventor:
J. P. Wilson
By Vernon E. Hodges
Atty.

UNITED STATES PATENT OFFICE.

J. PEARL WILSON, OF JACKSONVILLE, FLORIDA.

CHAIN-LUG.

1,226,156. Specification of Letters Patent. Patented May 15, 1917.

Application filed May 13, 1915. Serial No. 27,920.

*To all whom it may concern:*

Be it known that I, J. PEARL WILSON, a citizen of the United States, residing at Jacksonville, in the county of Duval and State of Florida, have invented certain new and useful Improvements in Chain-Lugs, of which the following is a specification.

My invention relates to an improvement in chain-lugs.

The object of the present invention is to provide a device which is especially applicable to chains, and more particularly ordinary bicycle chains to be used in conveying material of any sort, in this instance veneer, through an equalizing saw and stapling machine. It consists of two plates of suitable shape and dimensions constructed and adapted to embrace the opposite sides of a chain-link, in connection with a spacing-sleeve of a length corresponding to the width of the link to which the lug is applied, adapted to be inserted adjacent to the link and between the plates, and a bolt passing through the plates and spacing-sleeve for holding the lug composed of such plates in rigid embrace upon the link.

In the accompanying drawings:—.

Figure 1 is a view in side elevation showing a chain with several of these lugs in various forms, namely a straight lug and a right and left-hand lug;

Fig. 2 is a transverse vertical section; and

Fig. 3 is a view of one of the plates, forming a lug, from the inside.

Figs. 4, 5, 6 and 7 show slight modifications.

The lug may be made in various forms, but it consists essentially in two similarly-shaped plates 1, 1, each preferably having an inwardly-extending flange 2 at the inner end, which fits and embraces the inner rounded edge of an ordinary bicycle link, as shown.

A spacing-sleeve 3, of a length approximately corresponding with the width of the link to which the lug is applied, is inserted between the two plates, and a bolt 4 extends through the holes in the plates and through the bore of the sleeve, and the nut 5 and lock-nut 6 are secured tight thereon, whereby the plates are secured rigidly to the link of the chain midway between its ends, the sleeve fitting down tight against the edge of the link by preference, so that the link is embraced not only from the sides, but from the upper and lower edge between the flange ends and the spacing-sleeve.

The lug may be in various sizes or shapes, not only composed of straight plates as described, and as shown at the right of Fig. 1, but it might be in other forms, as for instance right and left-hand lugs, in which instance plates are more or less Z-shaped, as also shown in Fig. 1, the purpose of which form is to get different dimensions on the sides, top and bottom of boxes, as the lug is adapted to be used very largely on machines making wire-bound boxes and crates.

The lug thus constructed and fastened in this way permits the chain to be driven uninterruptedly on the sprocket-wheel without any interference.

As a very slight modification, the sleeve 3 might be in the form of a filling-block, filling the entire upper space between the plates 1, 1, as shown at 8 in Fig. 7, in which a solid block of iron has a hole drilled for the bolt and takes the place of the round spacer where the lug is intended to come in contact with a trip, which otherwise might pass through the space between the plates 1', 1'.

Or the lug might be made in two halves 9, 9, as shown in Figs. 5 and 6, the inner edges of which just come together, as shown in Fig. 5, and form a socket 10 to receive the shank 12 of an extension 11, thus constituting an adjustable lug desirable in some instances. This provides for substituting an extension of various sizes for different purposes.

I claim:

1. A chain-lug comprising two plates constructed and adapted to embrace a chain-link from opposite sides, a spacing-sleeve, approximately corresponding in length to the width of the link to which the lug is secured, inserted between the plates, and a bolt extending through the holes in the plates and the bore of the sleeve, and a nut screwed thereon for holding the plates composing the lug securely upon the link.

2. The combination with a chain, of a lug composed of two plates having flanged inner ends, which fit and embrace the inner edges of the link, a spacing-sleeve of a length approximately corresponding to the width of the link inserted between the plates in position to engage the outer edge of the link, and a fastening means extending through the sleeve and holes in the plates for securing the plates and sleeve together and the lug rigidly upon the link.

In testimony whereof I affix my signature.

J. PEARL WILSON.